United States Patent [19]

Fuller

[11] Patent Number: 4,924,592

[45] **Date of Patent: * May 15, 1990**

[54] PLATE SUNDIAL WITH INSTALLATION INDICIA

[76] Inventor: George L. Fuller, 444 E. Park Dr., Spartanburg, S.C. 29302

[ * ] Notice: The portion of the term of this patent subsequent to Jun. 6, 2006 has been disclaimed.

[21] Appl. No.: 337,071

[22] Filed: Apr. 12, 1989

[51] Int. Cl.[5] ...................... G04B 49/02; G01C 17/34; G01C 21/02

[52] U.S. Cl. ...................................... 33/270; 33/268

[58] Field of Search .................. 33/268, 269, 270, 271

[56] References Cited

U.S. PATENT DOCUMENTS

| | | | |
|---|---|---|---|
| 78,133 | 5/1868 | Risch | 33/271 |
| 2,440,827 | 5/1948 | Mareau | 33/270 |
| 2,441,636 | 5/1948 | Kaufman et al. | 33/270 |
| 2,531,932 | 11/1950 | Brown | 33/268 |
| 4,081,911 | 4/1978 | Eldridge | 33/270 |
| 4,333,243 | 6/1982 | McLaughlin | 33/268 |
| 4,835,875 | 6/1989 | Fuller | 33/270 |

FOREIGN PATENT DOCUMENTS

| | | | |
|---|---|---|---|
| 537924 | 7/1941 | United Kingdom | 33/270 |
| 596126 | 12/1947 | United Kingdom | 33/268 |

*Primary Examiner*—Thomas B. Will

[57] ABSTRACT

A typical plate and gnomon sundial with an enlarged dial plate and an extended gnomon is provided with latitude and longitude displacement indicia lines on the dial plate, beneath the gnomon and beyond the time indicia. A point is established on the gnomon from which a plumb line to the latitude and longitude displacement indicia lines can be determined. The latitude and longitude displacement indicia lines are placed so that when a plumb line from the point on the gnomon intersects the point of intersection of the site latitude indicium line with the site longitude displacement indicium line, the gnomon will be inclined to the horizontal at an angle equal to the latitude of the site and the plane(s) containing the gnomon and the 12 o'clock noon indicium line(s) will be inclined to a vertical plane containing the gnomon at an angle equal to the difference between the longitude of the site and the longitude of the time zone meridian.

Set up is accomplished at the site by plumbing from the point on the gnomon to the point of intersection of the site latitude and site longitude displacement indicia lines, and while holding this attitude rotating the sundial on a horizontal surface until the correct zone time is indicated by the shadow of the gnomon from the sun on the time indicia. This will mean that the sundial is correctly oriented and will continue to indicate correct zone time.

3 Claims, 1 Drawing Sheet

PLATE SUNDIAL WITH INSTALLATION INDICIA

BACKGROUND OF THE INVENTION

1. Field of the Invention

The present invention is a plate type sundial which indicates time of day by the shadow of a gnomon from the sun on a dial plate with an improvement to facilitate installation for indication of time in a broad range of latitudes and longitudes.

2. Description of the Prior Art

Sundials indicating local apparent time have been used for thousands of years in myriad shapes, styles, and designs. When standard time zones were adopted about a hundred years ago sundials were no longer of major importance as timekeepers. Their principal use now is ornamental. To indicate zone time at a particular site the plate sundial must be custom manufactured for that site, or it must be expertly installed to adjust the attitude for the difference between the design latitude and the site latitude and for the difference between the longitude of the time zone meridian and the longitude of the site meridian.

This inventor has received a Notice of allowance for a patent of a cylindrical sundial with installation indicia, and has filed an application for a patent of a hemispherical sundial with installation indicia.

SUMMARY OF THE INVENTION

The object of the invention is to provide an ornamental, universal, and economical plate type sundial which can easily be set up by the average person to indicate time-zone time at the site of the instrument.

The present invention provides latitude and longitudinal indicia so the attitude of the sundial can be set for the site by use of a plumb line. Once the attitude is set the sundial can be oriented by rotating on a horizontal surface until the correct zone time is indicated by the shadow of the gnomon from the sun. When secured in the correct attitude and orientation, the sundial will continue to indicate correct zone time.

DESCRIPTION OF THE PREFERRED EMBODIMENT

Figure 1:
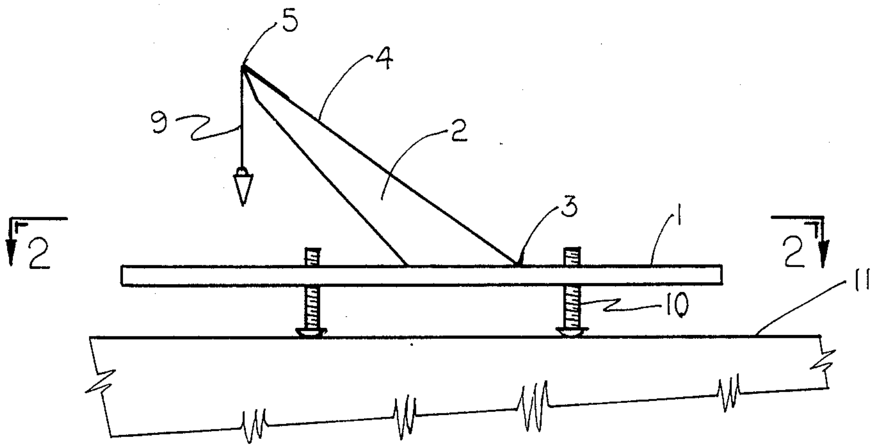
FIG. 1 is a side view of the preferred embodiment of the present invention.
Figure 2:
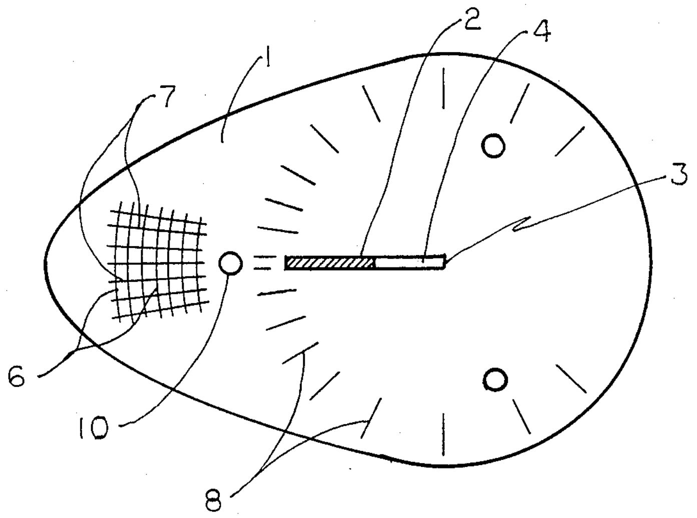
FIG. 2 is a top view taken along the line 2—2 of FIG. 1.

The present invention consists essentially of a dial plate 1 and a gnomon 2. Reference character 3 is an index point on the longitudinal centerline of dial plate 1.

Gnomon 2 is perpendicular to dial plate 1 and thus an upper edge 4 inclined to dial plate 1 at an angle Δ. The longitudinal centerline of upper edge 4 intersects dial plate 1 at index point 3. The value of Δ is not critical but ideally should equal the latitude of the site. For extreme northern and southern sites in the contiguous United States. a Δ equal to 35° causes no loss of time indication for six months and only up to about one hour of loss at the beginning and end of day at one of the solstices. Reference character 5 is a reference point on the longitudinal centerline of upper edge 4 of gnomon 2.

When the longitudinal centerline of upper edge 4 is parallel to the axis of the earth, it will be inclined to the horizontal at an angle equal to the latitude of the site. Latitude indicia lines 6 are circular arcs on dial plate 1 located from index point 3 a distance of: L×sin (90°−latitude)/sin (90°+latitude−Δ), where L is the distance between index point 3 and reference point 5.

When the longitudinal centerline of upper edge 4 is parallel to the axis of the earth and a plumb line from reference point 5 intersects the longitudinal centerline of dial plate 1, then the longitudinal centerline of dial plate 1 and the longitudinal centerline of upper edge 4 will be in the same plane as the merdian of the site. By revolving the entire sundial about the longitudinal centerline of upper edge 4 at an angle equal to the difference between the longitude of the site and the longitude of the time zone meridian, the plane containing the longitudinal centerline of upper edge 4 and the longitudinal centerline of dial plate 1 will be made parallel to the plane through the time zone meridian. Longitude displacement indicia lines 7 are located on dial plate 1 radially from index point 3 at an angle from the longitudinal centerline of dial plate 1 of: $\tan^{31\ 1}$ (sin Δx×tan longitude displacement), where longitude displacement is the difference between the longitude of the site meridian and the longitude of the time zone meridian.

Time indicia lines 8 are located on dial plate 1 by conventional means using the longitudinal centerline of dial plate 1, index point 3, and upper edge 4 of the gnomon as bases.

Reference character 9 is a removable and adjustable plumb line from reference point 5 to dial plate 1.

To set up the sundial, reference point 5 is plumbed directly over the point of intersection of site latitude indicium line 6 with site longitude displacement indicium line 7. Then while maintaining this attitude the sundial is rotated until the correct zone time is indicated by the shadow of the gnomon from the sun. The longitudinal centerline of upper edge 4 will then be parallel to the axis of the earth, and the plane containing the longitudinal centerline of upper edge 4 and the longitudinal centerline of dial plate 1 will be parallel to the plane of the time zone meridian. When secured in this attitude and orientation the sundial will continue to indicate the correct zone time.

In the preferred embodiment adjusting bolts 10 are used to adjust the attitude of the sundial on the horizontal top surface of stationary support 11, and the sundial is secured by use of a castable material about dial plate 1.

I claim:

1. A plate sundial for use at a site comprising:

(a) a dial plate having a top surface with a longitudinal centerline and with an index point on said longitudinal centerline;

(b) a gnomon perpendicular to said top surface of the dial plate with upper edge having a longitudinal centerline inclined to a plane defined by said top surface of the dial plate at an angle Δ of about 35° and with the vertex of said angle Δ of said index point on the dial plate, and with a reference point on said longitudinal centerline of the upper edge of the gnomon from which a plumb line can be extended to said dial plate;

(c) latitude indicia lines on said dial plate located a distance from said index point on the dial plate such that when said plumb line from the reference point on the longitudinal centerline of the upper edge of the gnomon intersects the latitude indicium line representing the latitude of the site, said centerline of the upper edge of the gnomon will be inclined to the horizontal at an angle equal to the latitude of the site;

(d) longitude displacement indicia lines on said dial plate representing the difference between the longitude of the plane of the site meridian and the longitude of the plane of a time zone meridian such that when said plumb line from the reference point on the centerline of the upper edge of the gnomon intersects the longitude displacement indicium line for the site, the plane defined by said longitudinal centerline of the upper edge of the gnomon and said longitudinal centerline of the dial plate will be inclined to a vertical plane through said longitudinal centerline of the upper edge of the gnomon at an angle equal to the longitude displacement of the site; and (e) time indicia lines on said dial plate such that when said longitudinal centerline of the upper edge of the gnomon is inclined to the horizontal at said angle equal to the latitude of the site, and when said plane defined by said longitudinal centerline of the dial plate and said longitudinal centerline of the upper edge of the gnomon is parallel to said plane of the time zone meridian, the correct zone time will be indicated by the shadow of the gnomon from the sun.

2. A sundial as set forth in claim 1 further comprising means to determine said plumb line from the reference point on the longitudinal centerline of the upper edge of the gnomon to said latitude and longitude displacement indicia lines.

3. A sundial as set forth in claim 1 further comprising means to adjust the attitude of said sundial such that said plumb line from the reference point on the centerline of the upper edge of the gnomon will intersect both said site latitude indicium line and said site longitude displacement indicium line.

* * * * *